(12) United States Patent
Ohashi et al.

(10) Patent No.: US 7,557,851 B2
(45) Date of Patent: Jul. 7, 2009

(54) PORTABLE TERMINAL EQUIPMENT

(75) Inventors: Masahiro Ohashi, Kasuya-Gun (JP); Maiko Taruki, Kitakyushu (JP)

(73) Assignee: Panasonic Corporation, Osaka (JP)

( * ) Notice: Subject to any disclaimer, the term of this patent is extended or adjusted under 35 U.S.C. 154(b) by 688 days.

(21) Appl. No.: 11/033,831

(22) Filed: Jan. 13, 2005

(65) Prior Publication Data
US 2005/0157195 A1 Jul. 21, 2005

(30) Foreign Application Priority Data
Jan. 20, 2004 (JP) .............................. 2004-011361

(51) Int. Cl.
*H04N 5/222* (2006.01)
*H04M 1/00* (2006.01)

(52) U.S. Cl. .................. 348/333.06; 348/373; 348/375; 348/376; 455/550.1

(58) Field of Classification Search ... 455/556.1–556.2, 455/575.1, 575.3; 348/373–376
See application file for complete search history.

(56) References Cited

U.S. PATENT DOCUMENTS

| | | | |
|---|---|---|---|
| 5,491,507 A * | 2/1996 | Umezawa et al. | 348/14.02 |
| 6,118,653 A * | 9/2000 | Kim | 361/679.23 |
| 6,587,151 B1 * | 7/2003 | Cipolla et al. | 348/373 |
| 6,751,473 B1 * | 6/2004 | Goyal et al. | 455/556.1 |
| 6,803,963 B2 * | 10/2004 | Yamazaki et al. | 348/375 |
| 6,812,958 B1 * | 11/2004 | Silvester | 348/207.1 |
| 6,882,864 B2 * | 4/2005 | Miyake | 455/556.1 |
| 6,996,424 B2 * | 2/2006 | Ijas et al. | 455/575.1 |
| 7,031,670 B2 * | 4/2006 | May | 455/90.3 |
| 7,061,536 B2 * | 6/2006 | Cha | 348/376 |
| 7,190,968 B2 * | 3/2007 | Nakamura | 455/550.1 |
| 7,242,975 B2 * | 7/2007 | Bae et al. | 455/575.3 |

(Continued)

FOREIGN PATENT DOCUMENTS

DE 297 22 657 6/1998

(Continued)

OTHER PUBLICATIONS

Japanese Office Action issued on Jan. 27, 2009 in connection with a Japanese application which is a foreign counterpart of the present application.

*Primary Examiner*—Jason Chan
*Assistant Examiner*—Pritham Prabhakher
(74) *Attorney, Agent, or Firm*—Wenderoth, Lind & Ponack, L.L.P.

(57) ABSTRACT

Portable terminal equipment includes an upper chassis, a lower chassis, a connector therebetween, a camera holder, and a camera. The upper chassis includes the first obverse side and the first reverse side. The lower chassis includes the second obverse side and the second reverse side. The connector is operable to collapsibly interconnect the upper and lower chassis. The camera holder is slidable outward and inward with respect to either the upper chassis or the lower chassis. The camera is disposed on the camera holder in a relationship coextensive with the first obverse side. When the upper and lower chassis are opened up, then images taken by the camera are displayed on a first display. When the upper and lower chassis are folded up, then images taken by the camera are displayed on a second display. Thus the thinned portable terminal equipment including the single camera is operable to photograph both a user and any other subject.

5 Claims, 4 Drawing Sheets

U.S. PATENT DOCUMENTS

| | | | |
|---|---|---|---|
| 2001/0029167 A1* | 10/2001 | Takeda et al. | 455/41 |
| 2003/0078082 A1* | 4/2003 | Su | 455/572 |
| 2003/0164881 A1 | 9/2003 | Ohe et al. | |
| 2004/0014488 A1* | 1/2004 | Sawayama et al. | 455/550.1 |
| 2005/0128284 A1* | 6/2005 | Hoffer et al. | 348/14.02 |
| 2006/0063570 A1* | 3/2006 | Nishimura | 455/575.3 |

FOREIGN PATENT DOCUMENTS

| | | |
|---|---|---|
| EP | 0 898 405 | 2/1999 |
| EP | 1 246 464 | 10/2002 |
| EP | 1 383 324 | 1/2004 |
| JP | 2002-094635 | 3/2002 |
| JP | 2002-176577 | 6/2002 |
| JP | 2002-281142 | 9/2002 |
| JP | 2002-374444 | 12/2002 |
| JP | 2003-18272 | 1/2003 |
| JP | 2003-018272 * | 1/2003 |
| JP | 2003-60764 | 2/2003 |
| JP | 2003-169116 | 6/2003 |
| JP | 2003-188968 | 7/2003 |
| JP | 2003-229937 | 8/2003 |
| JP | 2003-304308 | 10/2003 |
| JP | 2003304308 | 10/2003 |
| JP | 2003-333141 | 11/2003 |
| JP | 2003-338857 | 11/2003 |

* cited by examiner

PORTABLE TERMINAL EQUIPMENT

BACKGROUND OF THE INVENTION

1. Field of the Invention

The present invention relates to camera-equipped, foldable portable terminal equipment such as a cellular phone unit, a PDA, and a digital camera.

2. Description of the Related Art

Foldable portable terminal equipment including cameras is disclosed in Published Japanese patent application 2003-304308. The disclosed portable terminal equipment includes lower and upper chassis and a connector therebetween for collapsibly interconnecting these two chassis. A display and a first camera are disposed on the upper chassis on the obverse side thereof. The lower chassis has a keyboard disposed on the obverse side thereof and a second camera disposed on the reverse side thereof. When the upper and lower chassis are folded up, then the obverse side of the upper chassis is overlaid with that of the lower chassis, and the first camera is hidden from view.

To photograph a user itself, the user opens up the upper and lower chassis to take a self-picture of the user using the first camera. The monitored image of the user is displayed on the display on the obverse side of the upper chassis, and the user can take a picture of the user itself while watching the display to see how the user is displayed.

To take a picture of any photographic subject other than the user, the user opens up the upper and lower chassis, and then directs the second camera at the subject to take a picture thereof. The monitored image of the subject is similarly displayed on the same display as above, and the user can photograph the subject while watching the display to see how the subject is displayed.

Preferred portable terminal equipment has the most compact and thin structure possible and the fewest components possible in light of high portability and less cost. However, such demands are difficult to meet because the above-described portable terminal equipment is based on the premise of two or more cameras thereon.

Published Japanese patent application 2003-60764 discloses different portable terminal equipment including a single camera operable to photograph both a user itself and other subjects. More specifically, a connector has a pivotable camera holder, on which the single camera is mounted. This construction allows the user to manually pivot the camera holder, and the camera can be oriented at the user and other subjects. This feature provides fewer components in the portable terminal equipment.

However, a drawback to the disclosed portable terminal equipment is that the connector is rendered considerably larger in thickness, and consequently it is impossible to smooth out the technical issue to realize the portable terminal equipment having the most compact and thin structure possible.

OBJECTS AND SUMMARY OF THE INVENTION

In view of the above, an object of the present invention is to provide foldable portable terminal equipment having the most compact and thin structure possible and the fewest components possible.

A first aspect of the present invention provides portable terminal equipment including an upper chassis, a lower chassis, a connector therebetween, a first display, a camera holder, and a camera. The upper chassis includes the first obverse side and the first reverse side. The lower chassis includes the second obverse side and the second reverse side. The connector is operable to collapsibly interconnect the upper chassis and the lower chassis to allow the first obverse side to cover the second obverse side when the upper and lower chassis are folded up. The first display is provided on the first obverse side. The camera holder is extensible outward and retractable inward with respect to either the upper chassis or the lower chassis. The camera is disposed on the camera holder in a relationship coextensive with the first obverse side. In the portable terminal equipment as just discussed, images taken by the camera are displayed on the first display while the upper and lower chassis remain opened up.

The above construction allows the camera to be used when the upper and lower chassis are both opened up and folded up, and consequently a user can photograph the user itself and other photographic subjects without the need for more cameras. According to the above construction, the camera is mounted on the camera holder so as to be slidable in union with the camera holder, instead of being mounted on the connector. These constructive features provide compact portable terminal equipment without the need for a thickened connector therein.

While the camera holder remains retracted, the camera is covered by the upper and lower chassis, and is thus protected against damage and breakage.

A second aspect of the present invention provides portable terminal equipment as defined in the first aspect of the present invention, which further includes a second display disposed on the first reverse side, whereby images taken by the camera are displayed on the second display while the upper and lower chassis remain folded up.

After folding up the upper and lower chassis, the user can slide the camera holder to direct the camera at subjects other than the user, whereby images taken by the camera are displayed on the second display. As a result, the user can photograph the subjects while watching the second display to see how they are displayed.

A third aspect of the present invention provides portable terminal equipment as defined in the first aspect of the present invention, which further includes a lighting unit disposed adjacent to the camera.

The above construction turns on the lighting unit to supply subjects with sufficient light intensity, thereby providing satisfactory photographic results, even with dark environments.

A fourth aspect of the present invention provides portable terminal equipment as defined in the first aspect of the present invention, which further includes a viewfinder disposed adjacent to the camera.

The above construction allows the user to ascertain, by viewing subjects through the viewfinder, how the subjects are viewed, without the need for any display other than the first display. This feature provides more compact portable terminal equipment.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Preferred embodiments of the present invention are now described with reference to the accompanying drawings.

First Embodiment

Portable terminal equipment according to the present embodiment is described with reference to FIGS. 1-3 on the premise that the portable terminal equipment as described herein may be a cellular phone unit.

Figure 1A:
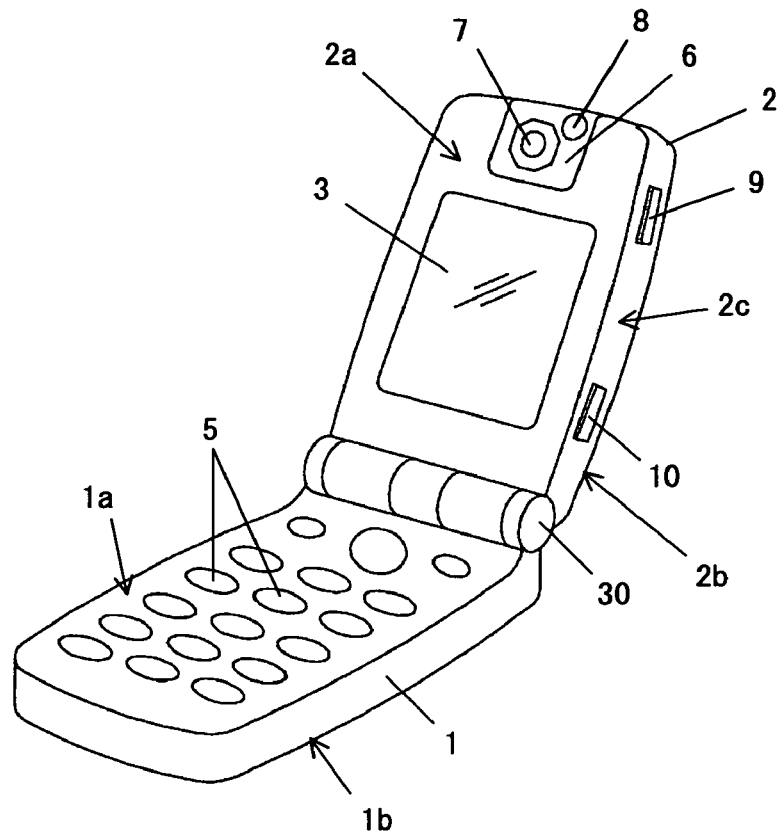
FIG. 1(*a*) is a perspective view illustrating opened portable terminal equipment having a camera holder retracted according to a first embodiment when viewed from the obverse sides of upper and lower chassis of the portable terminal equipment.
FIG. 1(b) is a perspective view illustrating the opened portable terminal equipment having the camera holder retracted according to the first embodiment, but when viewed from the reverse side of the upper chassis.
Figure 1B:
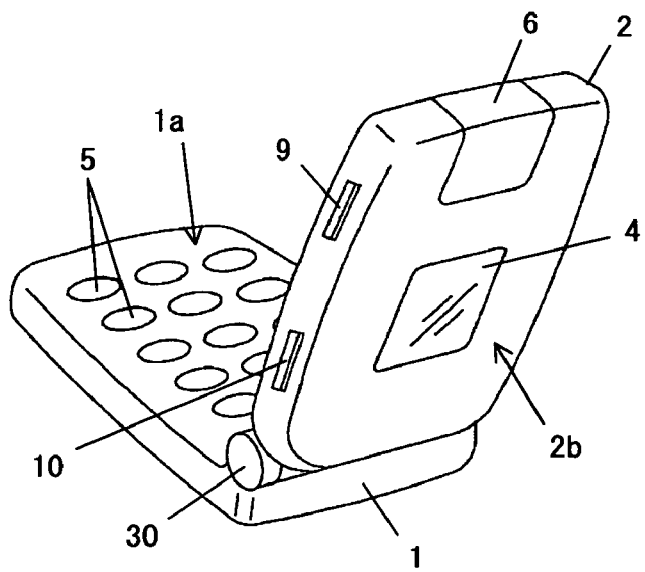

Referring to FIG. 1, the portable terminal equipment according to the present embodiment is shown having upper and lower chassis opened up. The portable terminal equipment as illustrated in perspective form in FIG. 1(a) is viewed from the obverse sides of the upper and lower chassis. The portable terminal equipment as illustrated in perspective form in FIG. 1(b) is viewed from the reverse side of the upper chassis.

As illustrated in FIG. 1, the portable terminal equipment includes the upper chassis 2, the lower chassis 1, and a connector 30 therebetween, a first display 3, a second display 4, a camera holder 6, a camera 7, and a lighting unit 8. The upper chassis 2 includes the first obverse side "2a" and the first reverse side "2b". The lower chassis 1 includes the second obverse side "1a" and the second reverse side "1b". The connector 30 is operable to collapsibly connect the lower end of the upper chassis 2 to the proximal end of the lower chassis 1 to allow the first obverse side "2a" to cover the second obverse side "1a" when the lower and upper chassis 1, 2 are folded up. The lower chassis 1 has a keyboard 5 provided on the second obverse side "1a".

The upper chassis 2 includes the first and second displays 3, 4. The first display 3 is disposed on the first obverse side "2a", while the second display 4 is disposed on the first reverse side "2b". The first and second displays 3, 4 may be liquid crystal displays.

The camera holder 6 is provided on the upper chassis 2 so as to be linearly slid to extend from the upper chassis 2 in an outwardly upward direction of the upper chassis 2, but to be linearly slid to retract therefrom in a downwardly inward direction of the upper chassis 2. To this end, according to the present embodiment, a slide switch 9 is provided on the upper chassis 2 on the side surface "2c" thereof.

Figure 2A:
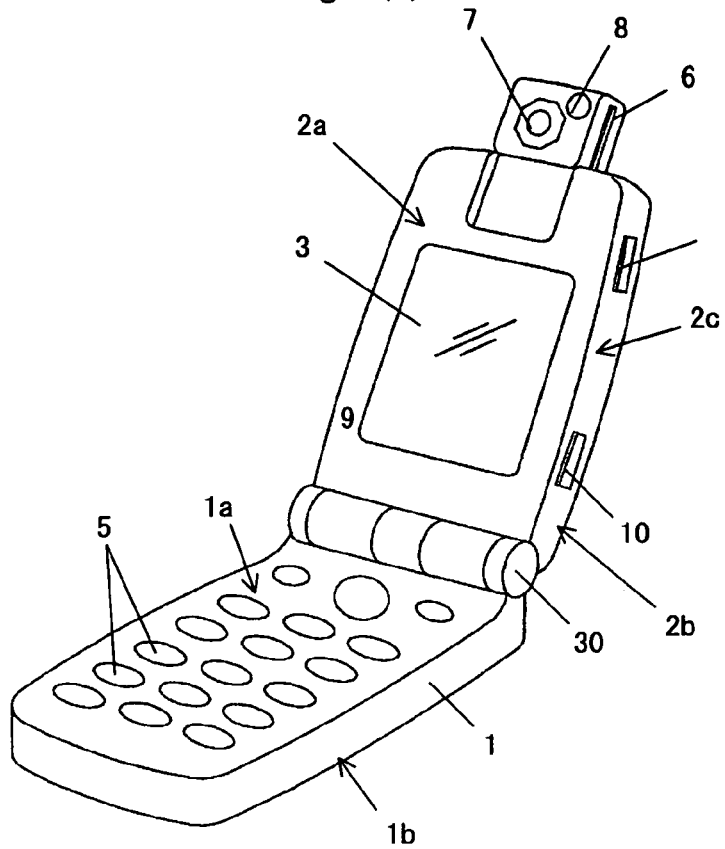
FIG. 2(a) is a perspective view illustrating the opened portable terminal equipment having the camera holder slid to extend outward from the upper chassis according to the first embodiment when viewed from the obverse sides of the upper and lower chassis.
Figure 2B:
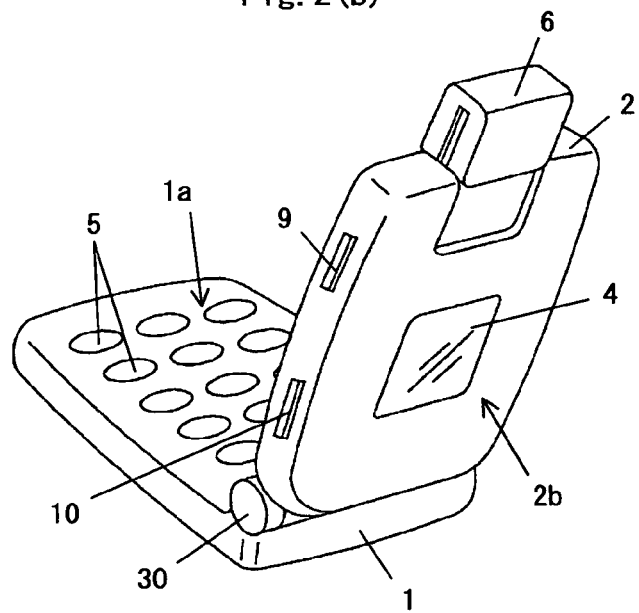
FIG. 2(b) is a perspective view illustrating the opened portable terminal equipment having the camera holder slid to extend outward from the upper chassis according to the first embodiment, but when viewed from the reverse side of the upper chassis.

When a user presses the slide switch 9, then the camera holder 6 is moved from a non-slid position as illustrated in FIG. 1(a) and FIG. 1(b) to a slid position of FIG. 2(a) and FIG. 2(b).

Since the subject matter of the present invention excludes a sliding mechanism, detailed descriptions thereof are herein omitted, but any known sliding mechanism may be used. An alternative camera holder 6 manually both extensible and retractable by the user may be employed instead of the sliding mechanism.

The camera 7 is mounted on the camera holder 6 in a relationship coextensive with the first obverse side "2a". A shutter switch 10 is disposed on the upper chassis 2 on the side surface "2c" at a downward position thereof.

As shown in FIG. 1(a), images taken by the camera 7 are displayed on the first display 3 while the upper and lower chassis 1, 2 remain opened up. In this state, the user can orient the camera 7 at the user itself to press the shutter switch 10, thereby photographing self-portraits of the user. Since the self-portraits of the user are displayed on the first display 3, the user can take self-pictures thereof while checking the first display 3 to see how the user is displayed.

The lighting unit 8 is provided on the camera holder 6 adjacent to the camera 7. The lighting unit 8 may typically be a flash lamp or equivalent. When the camera 7 photographs any photographic subject including the user itself, then the lighting unit 8 emits light simultaneously to supply the subject with sufficient light intensity.

Preferably, the linearly extensible and retractable camera holder 6 is provided on the upper chassis 2, not on the connector 30. As a result, the portable terminal equipment including the camera holder 6 according to the present embodiment is substantially similar in size to non-camera equipped, portable terminal equipment. This means that the present embodiment provides compact portable terminal equipment.

Figure 3A:
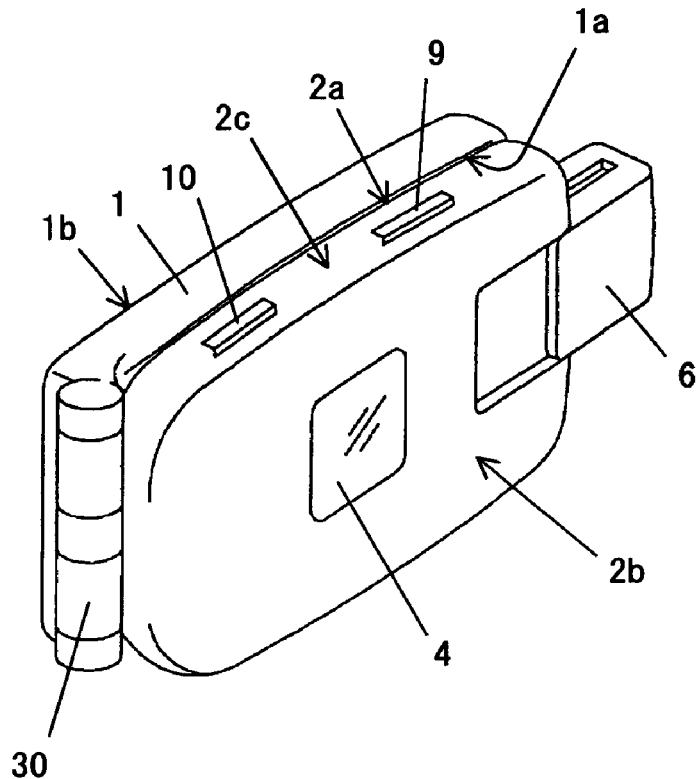
FIG. 3(a) is a perspective view illustrating the folded portable terminal equipment having the camera holder slid to extend outward therefrom according to the first embodiment when viewed from the obverse side of the folded portable terminal equipment.
Figure 3B:
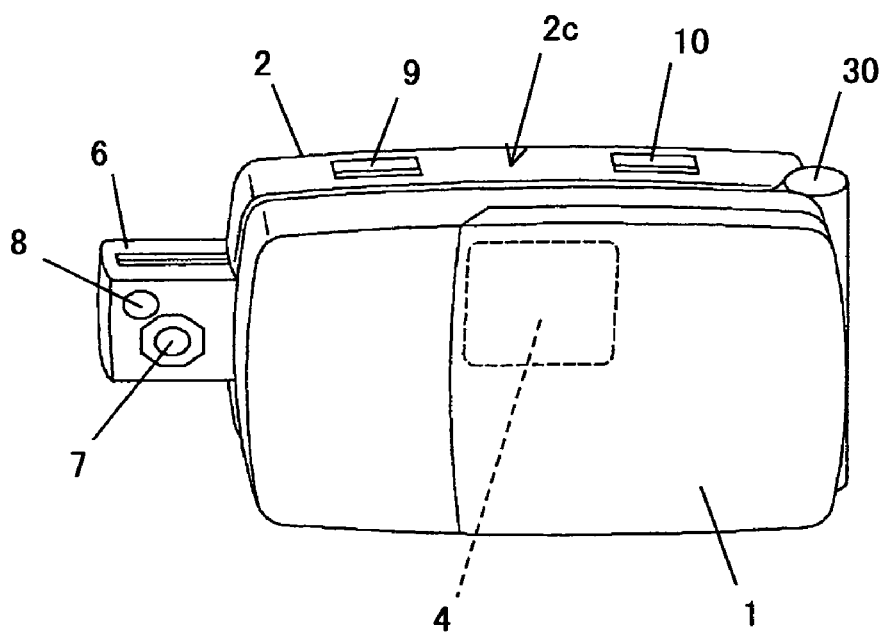
FIG. 3(b) is a perspective view illustrating the folded portable terminal equipment having the camera holder slid to extend outward therefrom according to the first embodiment, but when viewed from the reverse side of the folded portable terminal equipment.

Referring to FIG. 3(a) and FIG. 3(b), the portable terminal equipment according to the present embodiment is shown including the second display 4. The camera holder 6 is slidable to extend outward from the upper chassis 2, and both of the camera 7 and the lighting unit 8 are exposed to the outside when the lower and upper chassis 1, 2 are folded up, whereby images taken by the camera 7 are displayed on the second display 4.

When the user directs the camera 7 at any subject other than the user, then the second display 4 is oriented at the user, and consequently the user can check the second display 4 to see how the subject is viewed by the camera 7. Accordingly, the user can press the shutter switch 10 to photograph the subject other than the user when ascertaining that the subject is in position.

In operation, the single camera 7 allows the user to take both a self-picture thereof and a picture of any other subject.

To take a picture of the user, the first display 3 allows the user to ascertain how the user itself is viewed. To take pictures of other subjects, the second display 4 allows the user to ascertain how the subjects are viewed.

The present embodiment provides the above advantages without an increase in size of the portable terminal equipment and without an increase in the number of components therein.

Second Embodiment

Figure 4A:
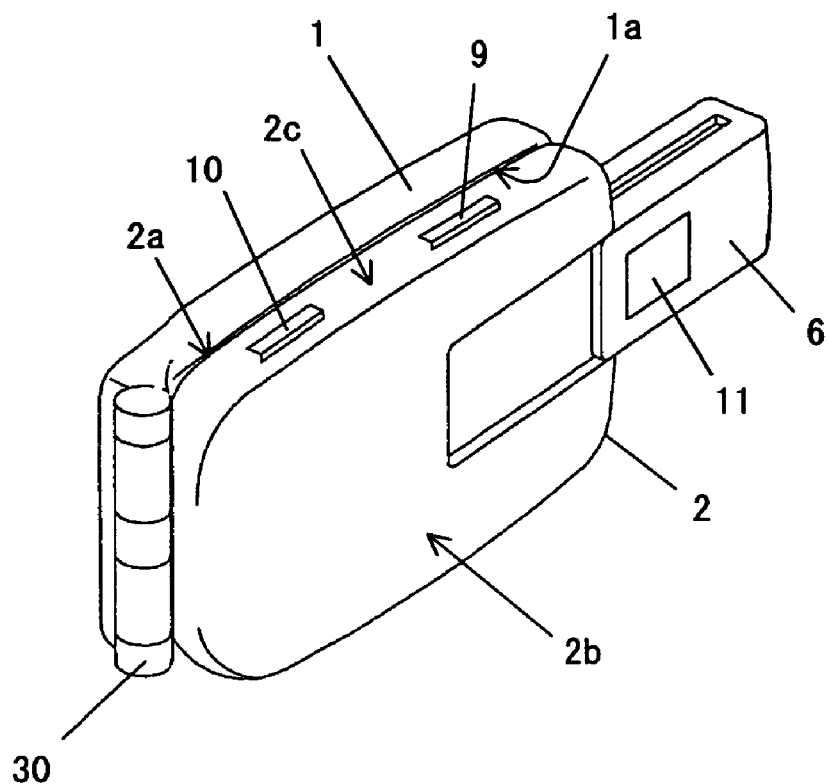
FIG. 4(a) is a perspective view illustrating a folded portable terminal equipment having a camera holder slid to extend outward therefrom according to a second embodiment when viewed from the obverse side of the folded portable terminal equipment.
Figure 4B:
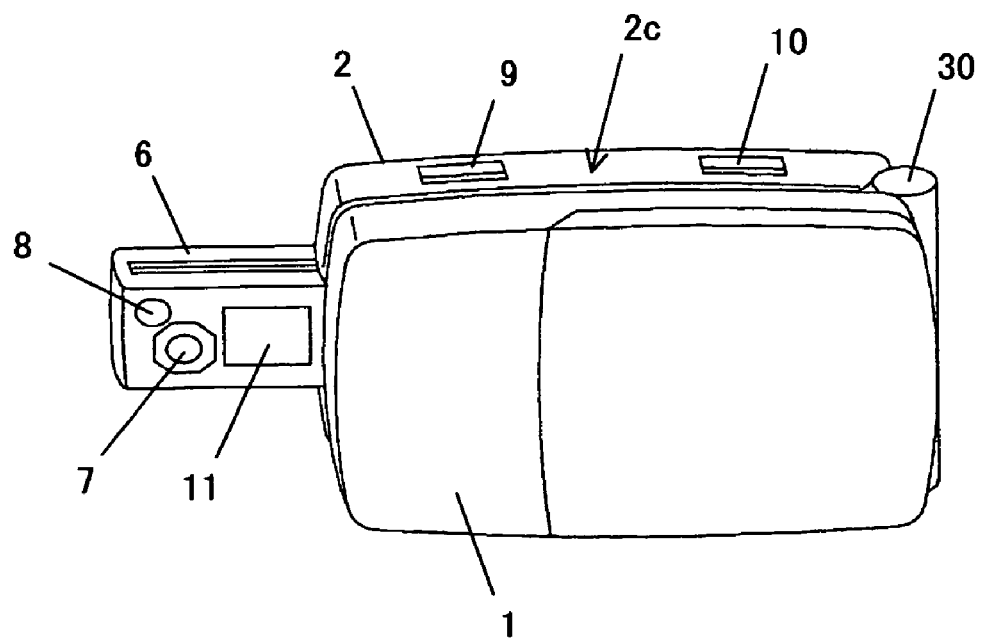
FIG. 4(b) is a perspective view illustrating the folded portable terminal equipment having the camera holder slid to extend outward therefrom according to the second embodiment, but when viewed from the reverse side of the folded portable terminal equipment.

Referring to FIG. 4(a) and FIG. 4(b), portable terminal equipment according to a second embodiment is illustrated in which elements similar to those of FIGS. 1-3 are identified by the same reference characters, and therefore descriptions related thereto are herein omitted.

As illustrated in FIG. 4(a) and FIG. 4(b), the portable terminal equipment according to the present embodiment is free of the second display 4 accompanied by the previous embodiment, but provides advantages substantially similar to those according to the previous embodiment.

The present embodiment differs from the previous embodiment in that a somewhat larger-sized camera holder 6 is provided with a viewfinder 11 as well as a camera 7 and a lighting unit 8. The viewfinder 11 may be a hole through a camera holder 6 at a portion outwardly extending from the upper chassis 2, whereby the user can view photographic subjects in a direction toward the reverse side "1b" from the reverse side "2b". More specifically, the viewfinder 11 may be an aperture having a transparent film affixed thereto. In principle, the viewfinder 11 may be a simple void space.

While viewing the subjects through the viewfinder 11, the user can ascertain how the subjects are viewed, before photographing them using the camera 7. This feature eliminates the second display 4, and consequently provides lighter-weighted portable terminal equipment.

FIGS. 1-4 are offered merely for purposes of illustration, and the photographic subjects, display methods, a position of the shutter 10, and a position of the slide switch 9 are susceptible to various changes and modifications.

In conclusion, the present invention provides the portable terminal equipment including the camera that is ready for use when the upper and lower chassis are both opened up and folded up, and that is mounted on the camera holder so as to be slidable in union with the camera holder, instead of the camera being provided on the connector. This feature provides the thinned portable terminal equipment without the need for a thickened connector therein.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Portable terminal equipment comprising:
   an upper chassis including a first obverse side and a first reverse side;
   a lower chassis including a second obverse side and a second reverse side;
   a connector arranged between said upper chassis and said lower chassis, said connector being operable to collapsibly interconnect said upper chassis and said lower chassis so as to allow the first obverse side to cover the second obverse side when said upper chassis and said lower chassis are in a folded up position;
   a first display provided on the first obverse side;
   a camera holder arranged so as to be extensible outward and retractable inward with respect to an end face of one of said upper chassis and said lower chassis; and
   a camera disposed on said camera holder in a relationship coextensive with the first obverse side,
   wherein said camera is arranged so as to be exposed to one of the first obverse side and the second obverse side when said camera holder is in a retracted position,
   wherein said camera is arranged such that a surface of said camera is covered by one of said upper chassis and said lower chassis when said camera holder is in the retracted position and said upper chassis and said lower chassis are in the folded up position, and
   wherein images taken by said camera are displayed on said first display while said upper chassis and said lower chassis remain in an opened up position.

2. Portable terminal equipment as defined in claim 1, further comprising:
   a second display disposed on the first reverse side,
   wherein images taken by said camera are displayed on said second display while said upper chassis and said lower chassis remain in the folded up position.

3. Portable terminal equipment as defined in claim 1, further comprising:
   a lighting unit disposed adjacent to said camera.

4. Portable terminal equipment as defined in claim 1, further comprising:
   a viewfinder disposed adjacent to said camera.

5. Portable terminal equipment as defined in claim 1, wherein the camera holder is arranged so as to be extensible outward and retractable inward with respect to the end face of either one of said upper chassis and said lower chassis when said upper chassis and said lower chassis are in the folded up position.

* * * * *